US007904651B2

(12) United States Patent
Muramatsu et al.

(10) Patent No.: US 7,904,651 B2
(45) Date of Patent: Mar. 8, 2011

(54) STORAGE DEVICE WITH DISK POWER CONTROL BASED ON LOGICAL STORAGE AREA

(75) Inventors: Kotaro Muramatsu, Odawara (JP); Ikuya Yagisawa, Machida (JP); Yoshifumi Zimoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 491 days.

(21) Appl. No.: 11/968,345

(22) Filed: Jan. 2, 2008

(65) Prior Publication Data
US 2008/0204920 A1    Aug. 28, 2008

(30) Foreign Application Priority Data

Feb. 28, 2007   (JP) .................................. 2007-048331
Oct. 5, 2007    (JP) .................................. 2007-261511

(51) Int. Cl.
  *G06F 12/00*  (2006.01)
(52) U.S. Cl. ......................................... 711/114; 713/324
(58) Field of Classification Search .................. 711/114; 713/324
See application file for complete search history.

(56) References Cited

U.S. PATENT DOCUMENTS

| 6,950,263 | B2 | 9/2005 | Suzuki et al. | |
| 7,080,201 | B2 | 7/2006 | Suzuki et al. | |
| 7,639,493 | B2 | 12/2009 | Hori et al. | |
| 2006/0193073 | A1 | 8/2006 | Hakamata et al. | |
| 2007/0143542 | A1* | 6/2007 | Watanabe et al. | 711/114 |
| 2007/0245165 | A1* | 10/2007 | Fung | 713/320 |
| 2008/0005461 | A1* | 1/2008 | Toda et al. | 711/112 |
| 2008/0168223 | A1* | 7/2008 | Reeves et al. | 711/114 |

FOREIGN PATENT DOCUMENTS

JP       2000-293314       10/2000

* cited by examiner

*Primary Examiner* — Kevin L Ellis
*Assistant Examiner* — Jared I Rutz
(74) *Attorney, Agent, or Firm* — Brundidge & Stanger, P.C.

(57) ABSTRACT

The present invention makes is possible to appropriately set the power saving control of the storage device from the management device of the storage device. In addition, the storage device executes control of the power saving for the magnetic disk device after ensuring consistency between an instruction from the administrator and the operating state of the magnetic disk device in the storage device.

4 Claims, 10 Drawing Sheets

| LUN | ARRAY CONFIGURATION | DISK NUMBER | DISK STARTUP STATE | DISK STATE | STATE INFORMATION | ELAPSED TIME |
|---|---|---|---|---|---|---|
| 0 | RAID5 | 0 | ON | NORMAL | NORMAL | 100000 |
| | | 1 | ON | NORMAL | NORMAL | 50000 |
| | | 2 | ON | NORMAL | NORMAL | 0 |
| 1 | RAID5 | 3 | OFF | NORMAL | POWER OFF INSTRUCTIOIN | 10000 |
| | | 4 | OFF | NORMAL | POWER OFF INSTRUCTIOIN | 50000 |
| | | 5 | OFF | NORMAL | POWER OFF INSTRUCTIOIN | 200 |
| | | 6 | OFF | NORMAL | POWER OFF INSTRUCTIOIN | 30000 |
| 2 | RAID5 | 7 | ON | NORMAL | POWER CONSERVATION INSTRUCTION | 30000 |
| | | 8 | ON | NORMAL | POWER CONSERVATION INSTRUCTION | 20000 |
| | | 9 | ON | NORMAL | POWER CONSERVATION INSTRUCTION | 5000 |
| ... | ... | ... | ... | ... | ... | ... |

FIG. 4

| RG NUMBER | LUN |
|---|---|
| 0 | 0 |
| | 1 |
| 1 | 2 |
| | 3 |
| | 4 |

| DISK NUMBER | RAID GROUP NUMBER | MOTOR STOPPAGE FEASIBILITY |
|---|---|---|
| 0 | RG#1 | FEASIBLE |
| 1 | RG#1 | FEASIBLE |
| 2 | RG#1 | UNFEASIBLE |
| ... | ... | ... |

| ENCLOSURE NUMBER 1001 | ENCLOSURE STATE 1002 | DISK NUMBER 1003 |
|---|---|---|
| 0 | PACKAGE ON | 1, 2, 3, 4 |
| 1 | PACKAGE ON | 5, 6, 7, 8 |
| 2 | PACKAGE OFF | 9, 10 |
| 3 | ENCLOSURE POWER SUPPLY OFF | 11, 12, 13 |
| ... | ... | ... |

204 ENCLOSURE MANAGEMENT INFORMATION

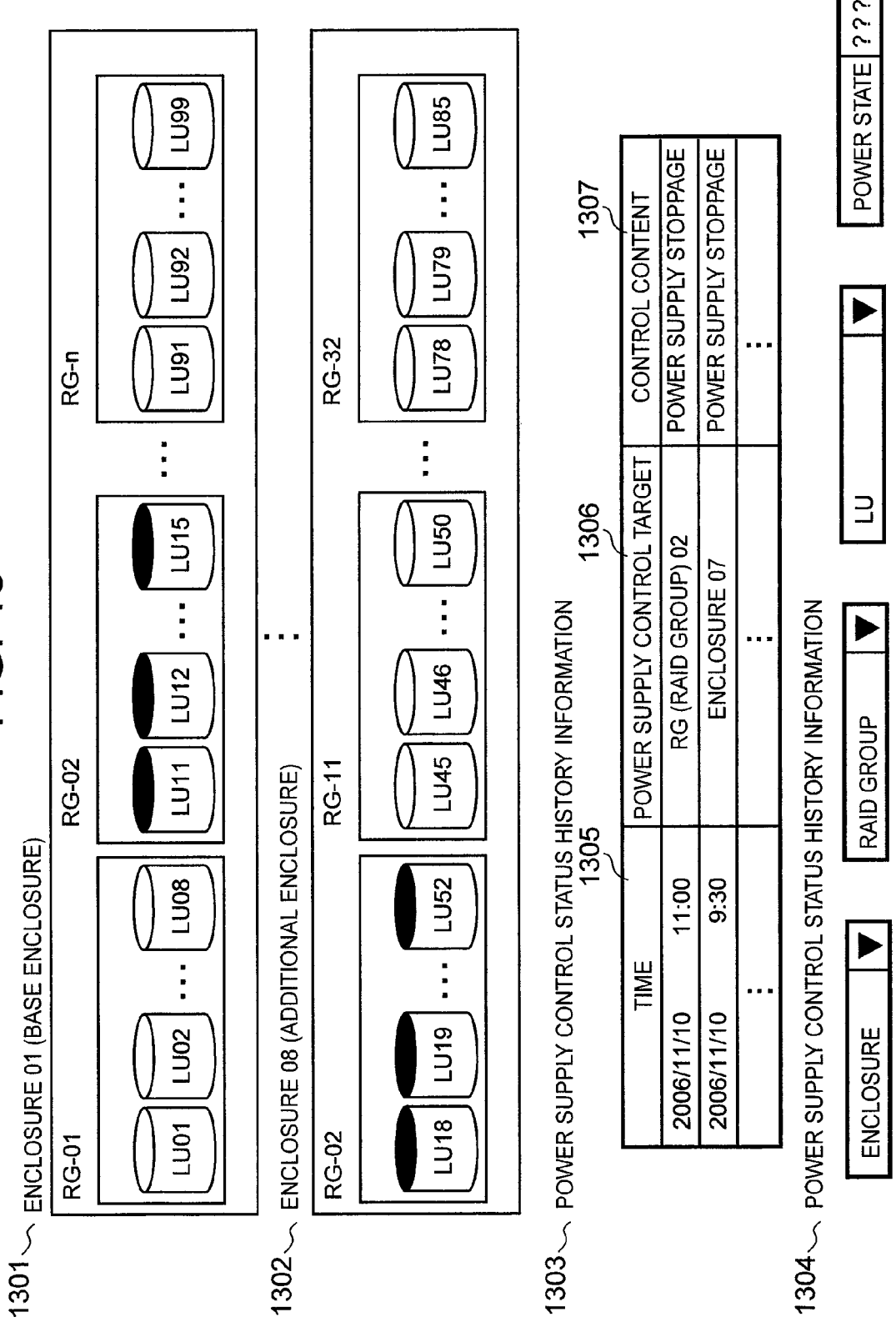

STORAGE DEVICE WITH DISK POWER CONTROL BASED ON LOGICAL STORAGE AREA

CROSS-REFERENCE TO PRIOR APPLICATION

This application relates to and claims the benefit of priority from Japanese Patent Application number 2007-48331, filed on Feb. 28, 2007, and Japanese Patent Application number 2007-261511, filed on Oct. 5, 2007 the entire disclosure of which are incorporated herein by reference.

BACKGROUND

The present invention generally relates to a storage device.

The method generally used to control a magnetic disk device involves turning the power ON when access is received, executing rotation of the magnetic storage medium, responding to access by a host computer, and, after access is complete, turning OFF the power of the motor used to rotate the magnetic storage medium in a stepwise fashion. That is, magnetic disk devices contain various power saving modes and mainly possess a function to select a predetermined power saving mode when access is being received and to automatically shift to this mode.

A storage device comprises a storage unit in which a plurality of magnetic disk devices are connected in the form of an array and provides a host computer such as a server with logical storage areas ('LU' hereinbelow) comprising a plurality of magnetic disk devices. In order to increase reliability and so forth, the storage device provides the host computer with RAID (Redundant Array of Independent Disks)-based redundant LU. In such a storage device, in cases where there is very little access by the host computer, there is no need for all the magnetic disk devices to be operating. However, when a magnetic disk device temporarily stops rotating, same is unable to immediately respond to access by the host computer. Usage of the above control method that is generally employed for magnetic disk devices means that it takes time for the magnetic disk devices to operate in the event of an access request and the overall performance of the storage device drops considerably.

Therefore, in the case of the technology that appears in Japanese Application Laid Open No. 2000-293314, a technology which manages the positions of the magnetic disk devices that constitute the LU as well as the state of the access by the host computer to the logical volumes and which, in cases where there is no access to a logical volume in a magnetic disk device for a predetermined time (referred to as 'period A' hereinbelow), selects one of a plurality of power saving modes and shifts the magnetic disk device to the selected power saving mode has been disclosed (See Japanese Application Laid Open No. 2000-293314).

According to the technology that appears in Japanese Application Laid Open No. 2000-293314, in cases where the storage device provides an application for which access occurs intermittently with an LU, for example, a need sometimes arises to set period A which is the period in which it is judged that there is no access by the application to several hours depending on the access cycle of the application.

However, even in the case of such an application for which access occurs intermittently, the operation is sometimes such that access to the storage device does not occur for a long period as is the case during a scheduled stoppage at night. In the case of such an operation, a magnetic disk device is desirably shifted to a variety of power saving modes at the moment when the scheduled stoppage takes place in order to reduce power consumption.

However, with the technology that appears in Japanese Application Laid Open No. 2000-293314, unless a number of hours have elapsed since the storage device is accessed, the processing to shift the magnetic disk device to a variety of power saving modes is not executed. That is, excess power is consumed by a magnetic disk device which is known to have not been accessed by an application for several hours.

SUMMARY

Therefore, the present invention provides a storage device which allows power saving control for magnetic disk devices to be appropriately set by a management device of the storage device.

Meanwhile, the LU which the storage device provides for the application is arranged distributed between a plurality of magnetic disk devices. Furthermore, the storage device is often shared by a plurality of applications or a plurality of administrators. Hence, because the power saving control of the magnetic disk devices is performed in accordance with instructions from each of the administrators based on the circumstances of the operation of each application, there are sometimes inconsistencies with the operating states of other applications and the instructions of the other administrators. That is, in cases where an LU-A used by an application A during a scheduled stoppage and an LU-B which is used by an application B during operation are disposed in the same magnetic disk device, the storage device shifts to a magnetic disk device power saving mode which corresponds with the LU-A in accordance with an instruction from the administrator of application A and is unable to respond to access to the LU-B by application B.

Therefore, the present invention provides a method that executes power saving control after ensuring consistency between instructions from administrators and the operating states of the magnetic disk devices in the storage device.

In addition, even when consistency between an instruction from an administrator and the operating state of a magnetic disk device in the storage device has not been ensured, consistency is sometimes ensured subsequently as a result of changes in the operating states of each of the applications. In other words, even when application B is operating at the moment when there is an instruction to shift the magnetic disk device to a power saving mode from the administrator of application A during a scheduled stoppage, application B will subsequently sometimes no longer operate. Therefore, the present invention provides a method according to which, even when consistency has not been ensured between an instruction from the administrator and the operating state of a magnetic disk device in the storage device, the storage device receive the instruction from the administrator, monitors the usage states of the other LU until consistency has been ensured, waits until consistency has been ensured, and executes control to reduce the power consumption of the magnetic disk device at the point where the operation with respect to the magnetic disk device by application B has not been performed for a fixed period.

The storage device of the present invention comprises a plurality of magnetic disk devices; a power supply unit which supplies power to the magnetic disk devices; a rotational state control unit which transmits a signal for controlling the rotational state of motors of the magnetic disk devices to the magnetic disk devices; and a disk control unit which provides a host computer with a logical storage area comprising storage areas of the plurality of magnetic disk devices. The storage device receives an instruction to shift the rotational state of the magnetic disk device from the management device for each LU which constitutes a unit for access by the host computer.

The storage device comprises access information which indicates, for each of the logical storage areas, access by the host computer and management information which indicates the arrangement of the LU in the magnetic disk device. In cases where there is an instruction from the management device to shift the rotational state of the magnetic disk device and in cases where access with respect to all the LU in the magnetic disk device which corresponds with the LU for which the instruction is issued has not occurred for a predetermined time, control is executed to shift the rotational state of the magnetic disk device which corresponds with the LU for which the instruction is issued.

BRIEF DESCRIPTION OF THE DRAWINGS

FIG. 1 shows a first configuration view of a storage system;
FIG. 3 shows LU management information;
FIG. 4 shows RAID group configuration management information;
FIG. 13 shows a GUI.

DESCRIPTION OF THE PREFERRED EMBODIMENTS

Figure 1:
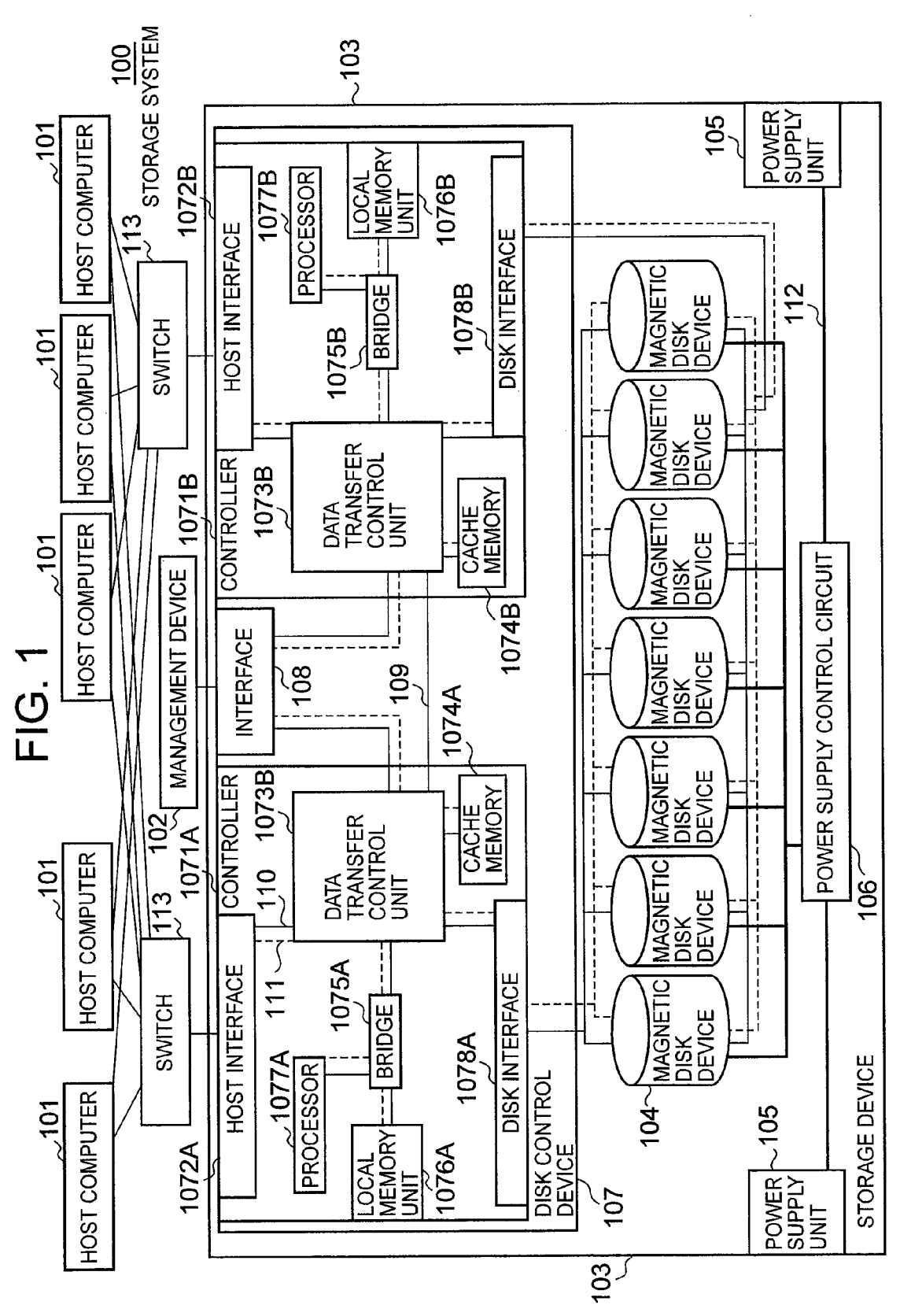
Figure 2:
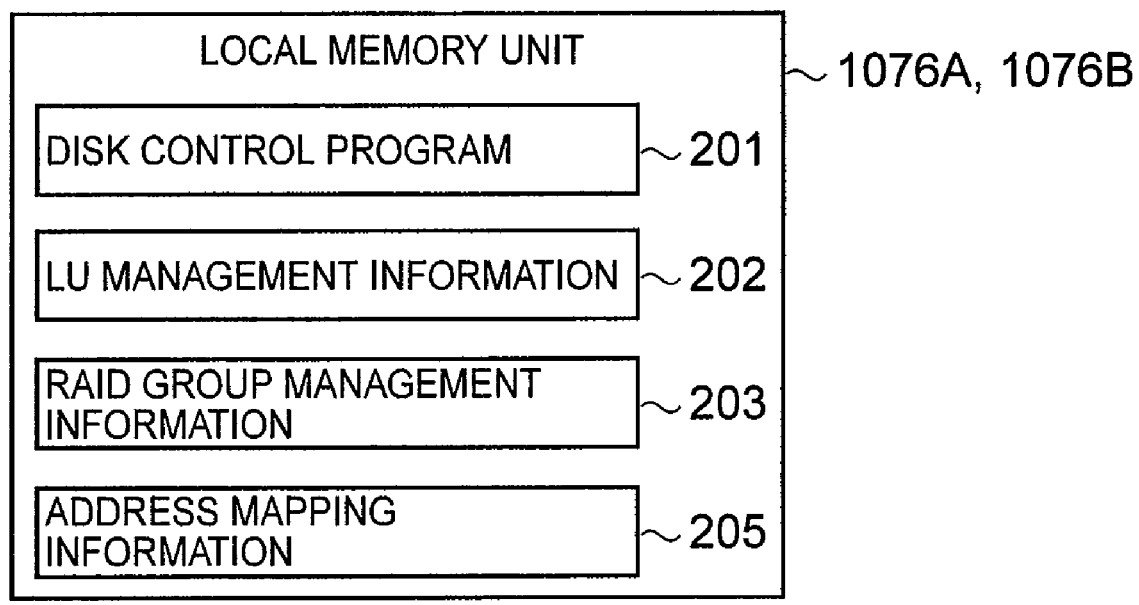
FIG. 2 shows a local memory.

An embodiment of the present invention will be described hereinbelow with reference to the drawings. FIG. 1 is a configuration view of a storage system 100 according to this embodiment.

The storage system 100 comprises a host computer 101, a management device 102, and a storage device 103. The storage device 103 comprises a plurality of magnetic disk devices 104, a power supply unit 105 which supplies power to the magnetic disk devices 104, a power supply control circuit 106 which performs power supply switching, and a disk control device 107. The host computer 101 and management device 102 are connected to the plurality of magnetic disk devices 104 via the disk control device 107.

The host computer 101 is a computer that comprises information processing resources such as a CPU (Central Processing Unit) and memory, for example, and is specifically constituted by a personal computer, a workstation, or a mainframe or the like. The host computer 101 sets logical storage areas ('LU' hereinbelow) which are provided by the disk control device 107 as targets and transmits data I/O request commands to the disk control device 107. The disk control device 107 provides the host computer 101 with storage areas which are arranged distributed between a plurality of magnetic disk devices 104 as one LU. The disk control device 107 provides the host computer 101 with a plurality of LU. The data which are stored in the magnetic disk device 104 are afforded RAID (Redundant Arrays of Inexpensive Disks)-based redundancy. A set of a plurality of magnetic disk devices 104 with a RAID configuration is known as a RAID group. The respective LUs are arranged across storage areas of the magnetic disk devices in the RAID group. Furthermore, the storage device has a plurality of RAID groups.

The management device 102 is connected to the storage device via an interface 108 and transmits instructions to the storage device 103 to change the settings of the configuration information of the storage device 103 such as, for example, to change the settings of the RAID groups or change the settings of the LU management information (described subsequently).

The disk control device 107 is constituted by two controllers 1071A and 1071B and an inter-controller connection path 109 which connects the controllers 1071A and 1071B in a communicable state. By making the controllers 1071A and 1071B redundant, when a fault has occurred in one controller, the other controller can be operated. In addition, in cases where the load is biased toward one controller, the load can be distributed by operating the other controller.

The respective controllers 1071A and 1071B control the reading and writing of data to and from the magnetic disk devices 104 in accordance with requests of the host computer 101 and comprise host interfaces 1072A and 1072B, data transfer control units 1073A and 1073B, cache memory units 1074A and 1074B, bridges 1075A and 1075B, local memory units 1076A and 1076B, processors 1077A and 1077B, disk interfaces 1078A and 1078B, and so forth. The respective elements in the controller are connected by a data transfer line 110 and a control command transfer line 111.

Of these, the host interfaces 1072A and 1072B are interfaces which perform communication control with respect to the host computer 101.

The data transfer control units 1073A and 1073B possess a function for data transfers between the two controllers 1071A and 1071B and for data transfers between the respective elements in the controllers 1071A and 1071B.

The bridges 1075A and 1075B are relay devices which connect the respective processors 1077A and 1077B and the respective local memory units 1076A and 1076B to the respective data transfer control units 1073A and 1073B in their own systems. Here, 'their own systems' refers to the respective constituent elements in the same controller. However, the respective constituent elements in the other controller will also be called the 'other system.'

The local memory units 1076A and 1076B are used in order to temporarily hold the various commands such as read commands or write commands which are supplied by the host computer 101. The processors 1077A and 1077B process the read commands and write commands which are stored in the local memory units 1076A and 1076B. In addition, as will be described subsequently, the local memory units 1076A and 1076B have various control programs and these programs are executed and processed by the processors 1077A and 1077B.

The processors 1077A and 1077B each have a function that governs control of the overall operation of the controllers 1071A and 1071B of their respective own systems. The processors 1077A and 1077B perform processing to read and write data to and from the magnetic disk devices 104 in accordance with write commands and read commands for LU which are stored in the local memory units 1076A and 1076B. The respective processors 1077A and 1077B perform processing to read and write data to and from those LU which have been exclusively assigned to their own processor beforehand (called 'associated LU' hereinbelow).

The assignment of the associated LU with respect to the respective processors 1077A and 1077B can be dynamically changed in accordance with the load states of the respective processors 1077A and 1077B, the receipt of an associated processor designation command which designates an associated processor for each LU and which is supplied by the host computer 101, or an instruction from the management device 102. Furthermore, the assignment of an associated LU to each of the processors 1077A and 1077B can also be dynamically changed as a result of the existence of a fault occurrence in the connection path between the disk control device 107 and the host computer 101 or in the connection path between the disk control device 107 and magnetic disk device 104.

In addition, the local memory units 1076A and 1076B store address mapping information 205 which indicates the relationship between the respective processors and the associated LU as well as address information on the local memory units of their own system and the other system and, upon receipt of a command transmitted by the host computer, judge, based on the address mapping information 205, whether the target LU is associated with the processor of their own system or the other system, and when the LU is associated with the processor of the other system, may apply control to transfer the command to the local memory unit of the other system on the basis of the address mapping information 205.

Although a redundant configuration in which two of each of the respective elements in the disk control device 107 are provided is illustrated in this embodiment, the configuration may also have one of each of these elements.

The magnetic disk devices 104 are able to assume each of three rotational states, namely, normal mode, power conservation mode, and motor stoppage mode in accordance with an instruction from the disk control device 107.

Normal mode is a state where the motor of the magnetic disk device rotates to an extent permitting the magnetic disk device to respond to access with respect to the storage areas of the magnetic disk devices 104 by the host computer 101.

Power conservation mode is a state where the magnetic disk devices 104 are in a standby state with a lower (slower) motor speed than that used in normal mode. In power conservation mode, the magnetic disk device is able to deal with access by the host computer 101 more rapidly than in a state where the motor is stopped, whereby the effect on performance can be reduced.

Motor stoppage mode is a standby state where the motors of the magnetic disk devices are stopped while power is supplied to the magnetic disk devices 104 in order to effect a greater reduction in power consumption than for magnetic disk devices 104 which are in power conservation mode.

By shifting the rotational state, i.e. reducing the rotational speed of the motors of the magnetic disk devices, the amount of power consumed by the magnetic disk devices can be reduced. In addition, heat is generated as a result of the power consumption of the magnetic disk devices and the rotation of the motors thereof. In order to avoid an increase in the temperature within the storage system caused by heat emission, the interior of the control device is cooled by means of a cooling device such as a fan or air conditioner, for example. By reducing the rotational speed of the motors of the magnetic disk devices or stopping the rotation of the motors, the heat emission within the storage device 103 can be reduced and the amount of power consumed by the cooling device can be reduced. However, access by the host computer to the LU disposed in the magnetic disk devices occurs arbitrarily. That is, in order to reduce the power consumption of the whole storage device 103, the magnetic disk devices must enter an optimum mode in accordance with the state of access to the LU disposed in the respective magnetic disk devices 104.

The magnetic disk devices 104 each receive an instruction via the control command transfer line 111 from the processors 1077A and 1077B and shift the rotational state.

FIG. 2 shows the information that the local memory units 1076A and 1076B hold. The local memory units store a disk control program 201 for performing power saving control, LU management information 202 for managing the access states and configuration information of each LU, RAID group management information 203 for managing the RAID group configuration information, and address mapping information 205. Although an example in which the various control programs are stored in local memory units is shown in this embodiment, the various control programs may also be stored in the system area of the storage areas of the magnetic disk devices.

FIG. 3 shows LU management information 202. LU management information 202 manages the states of access by the host computer 101 for each LU as well as configuration information for each LU. With the LU management information 202, setting changes are carried out in accordance with instructions from the management device 102. The LUN (Logical Unit Number) 301 shows the identification numbers assigned to each LU. The array configuration 302 indicates the RAID configuration of the RAID group to which the LU belong. The disk number 303 indicates the identification numbers of the magnetic disk devices 104 that constitute the RAID group which corresponds with the LU.

The disk startup state 304 indicates the actual states of the motors of the magnetic disk devices 104 comprising the LU. In cases where the disk startup state is shown as 'OFF', this constitutes a state where the motors of the magnetic disk devices 104 corresponding with the LU are stopped and it is not possible to respond immediately to access by the host computer 101 (because it takes time for the motors of the magnetic disk devices to rotate, access takes time). In cases where the disk state is shown as 'ON', this indicates a state where a magnetic disk device corresponding with the LU is able to immediately deal with access by the host computer 101.

The disk state 305 shows the presence or absence of faults with the magnetic disk devices which correspond with the LU and, in cases where a fault is sensed by the disk control program 201, 'anomaly' is shown.

The state information 306 is a mode for a magnetic disk device for which there has been an instruction from the management device 102 with respect to the LU. State information 306 is 'normal' in an initial state prior to receiving an instruction from the management device 103.

In cases where state information 306 is 'normal', this indicates that there has been an instruction from the management device 102 to set the magnetic disk devices 104 which correspond with the LU to an accessible state, that is, to normal mode. In cases where state information 306 is a 'power conservation instruction', this indicates that there has been an instruction from the management device 102 to reduce the speed of the motors of the magnetic disk devices 104 which correspond with the LU, that is, to set the magnetic disk devices 104 to power conservation mode. For example, in cases where it is judged that there has been no access for a fixed time, the system administrator issues an instruction to reduce the speed of the motors of the magnetic disk devices 104 which correspond with the LU via the management device 102. In cases where state information 306 is 'power OFF instruction', this indicates that there is an instruction from the system administrator via the management device 102 to stop the motors of the magnetic disk devices 104 which correspond with the LU, that is, to place the magnetic disk devices 104 in motor stoppage mode.

State information 306 indicates the instruction state from the management device 102. The processing to shift the rotational state of the actual magnetic disk device 104 is executed by the disk control program 201 after the state information 306 has been changed upon receipt of an instruction from the management device 102. That is, this does not mean that the content represented by the state information 306 indicates the state of the actual magnetic disk device 104 but instead indicates content with regard to the instruction from the management device 102 with respect to what kind of rotational states the magnetic disk devices which correspond with the LU should be placed in response to access to the LU. The processing of the disk control program 201 will be described subsequently.

The elapsed time 307 stores the elapsed time from the last access to the LU by the host computer 101 until the current time.

So that the LU management information 202 and RAID group management information 203 stored in the two local memory units 1076A and 1076B are always the same, when the information in the first local memory unit 1076A is updated, the information in the other local memory unit 1076B is updated in the same fashion. The processing of this information is executed by the disk control program 201.

FIG. 4 shows RAID group management information 203 which shows the relationship between the RAID groups and LU. The RAID group management information is set and updated by the system administrator via the management device 102. The RG number 401 indicates the identification number of the RAID group and the LUN 402 indicates the identification numbers of the LU contained in the RAID groups.

Figure 5:
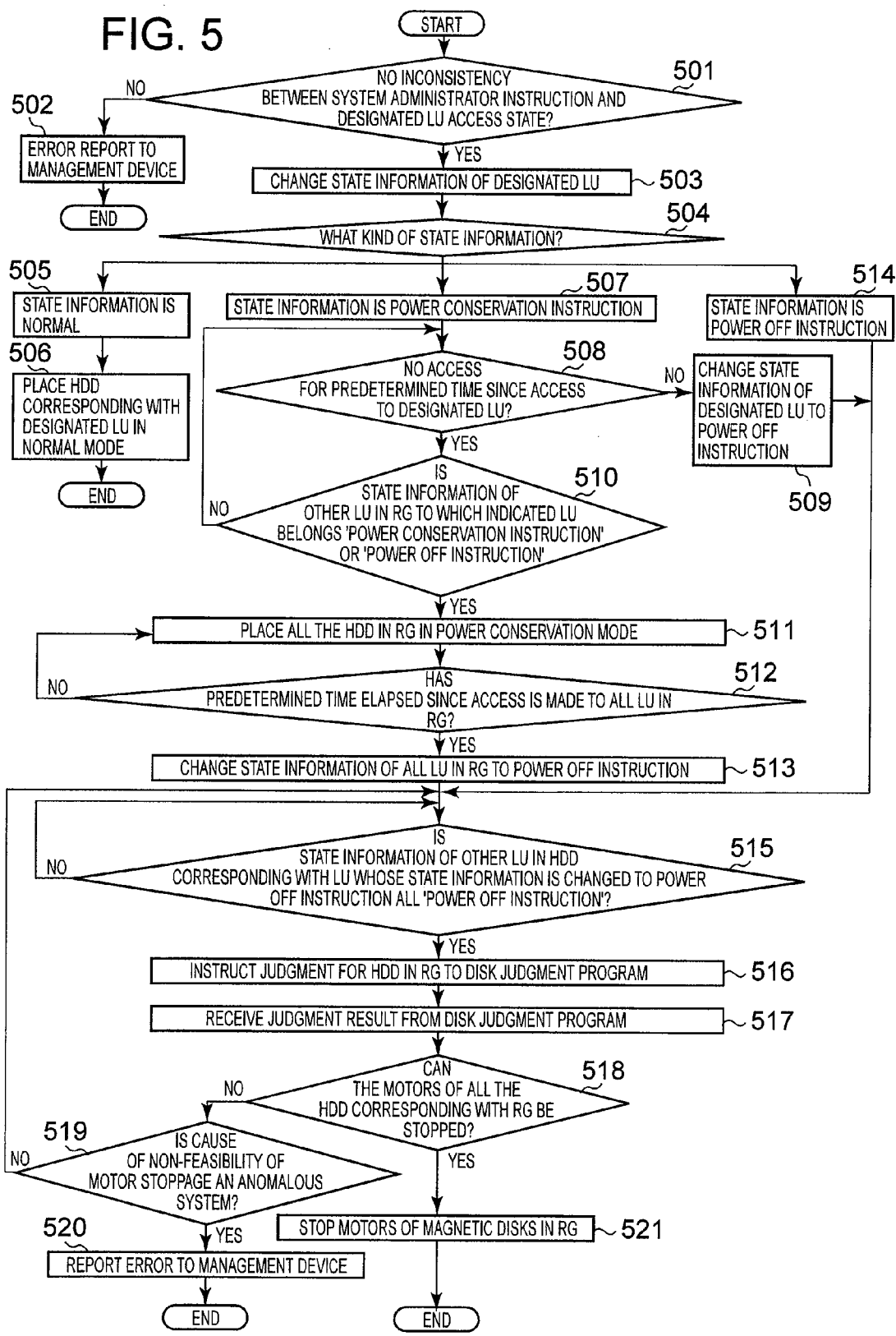
FIG. 5 shows the process flow of a control program.

FIG. 5 shows the flow of processing by the disk control program 201. The disk control program 201 is executed by the processors 1077A and 1077B. The processing by the disk control program 201 starts when the disk control program 201 senses that the system administrator has issued an instruction to shift the rotational state of the magnetic disk devices 104 which correspond with the LU for each LU via the management device 102.

The state information 306 of the LU management information 202 is managed for each LU but the management device 102 is able to grasp the RAID configuration of the storage device 103. Hence, an instruction to change the state information 306 from the management device 102 may be made for each RAID group, for each LU, or for every plurality of LU.

The disk control program 201 controls the rotational state of the magnetic disk devices 104 based on the instruction from the management device 102 and the status of access by the host computer 101. The access by the host computer 101 is performed in LU units. As will be described subsequently, by regularly confirming the elapsed time 307 of the LU management information 202 indicating the state of access by the host computer 101 for each LU, the disk control program 201 is able to control the rotational state of the magnetic disk devices 104 with pinpoint precision in accordance with the states of access by the host computer 101.

An example of the processing that is performed by the disk control program 201 in cases where the disk control program 201 senses that the storage device has received an instruction from the management device 102 to shift the rotational state of the magnetic disk devices 104 which correspond with the LU for each LU will now be described using FIG. 5.

When an instruction to shift the rotational state of the magnetic disk devices 104 is received from the management device 102, the disk control program 201 first judges whether the state information may be changed in accordance with the instruction from the management device 102 by checking same against the state of access by the host computer 101 to the LU for which the instruction is issued (501). The state of access by the host computer 101 to the LU for which the instruction is issued is confirmed by referencing the elapsed time 307. For example, in cases where there has been a 'power conservation instruction' or a 'power OFF instruction' from the management device 102 with respect to an LU for which access by the host computer 101 is continuous, the control program 201 judges that the state information is not to be changed.

This is because a change in the rotational state of magnetic disk devices 104 comprising the LU for which access is continuous would engender a fatal fault. In cases where there is an inconsistency between the state of access to the magnetic disk devices 104 and the instruction from the management device 102, the disk control program 201 reports an error to the management device 102 and ends the processing (502).

In addition, even for an LU that is not being accessed by the host computer 101, in cases where there is a 'power OFF instruction' from the management device (102) for an LU for which state information 306 is 'normal', the disk control program 201 advances the processing by changing the 'power OFF instruction' to 'power conservation instruction'. An LU for which the state information 306 is 'normal' has a high probability of receiving access immediately from the host computer 101. Accordingly, by changing the instruction from the management device 102 from a 'power OFF instruction' to a 'power conservation instruction', a magnetic disk device is made to standby with the motor of the magnetic disk device still rotating at a low speed in order to be able to rapidly deal with access by the host computer 101. Thereafter, the disk control program 201 changes the state information 306 of the LU for which the instruction is issued to a 'power conservation instruction'.

In the other cases above, the disk control program 201 changes the state information 306 of the LU for which the instruction is issued in accordance with an instruction from the management device 102 (503).

In cases where the state information 306 of the LU for which an instruction is issued is changed to 'normal' by the disk control program 201 (505), the disk number (303) of the LU management information 202 is referenced, the magnetic disk devices 104 which correspond with the LU for which the instruction is issued are confirmed, and an instruction is issued to the magnetic disk devices 104 via the control command transfer line 111 to place the rotational state of the magnetic disk devices 104 in the normal mode of being able to respond to access by the host computer 101 (506).

In cases where the state information 306 is changed to the 'power conservation instruction' by the disk control program 201 (507), the elapsed time 307 of the LU management information 202 is referenced, and it is confirmed whether the LU for which the instruction is issued has not been accessed for a predetermined time (508). In cases where the LU has not been accessed for a predetermined time, that is, in cases where the elapsed time 307 of the LU for which the instruction is issued exceeds a predetermined time, the state information 306 is also changed from a 'power conservation instruction' to a 'power OFF instruction' (509). Predetermined time (called 'predetermined time A' hereinbelow) as it is meant here is a time which serves as a reference for judging that access to the LU by the host computer has not occurred and can be appropriately set by the management device. In addition to cases of controlling a shift in the rotational state of the magnetic disk devices 104 which is carried out in the event of an instruction to change the state information from the management device 102 as per this embodiment, there are also cases where a shift in the rotational state of magnetic disk devices 104 that have not been accessed for a predetermined time (called 'predetermined time B' hereinbelow) in the judgment of only the disk control device 107 of the storage device 103 is controlled. Predetermined time A can be set to a shorter time in comparison with predetermined time B. This is because the system administrator or the like who is aware of the operating state of the host computer issues an instruction to the storage device 103 via the management device 102 and the time required until it is judged that there has been no access is shorter than predetermined time B which is for a case where a judgment is made only by the storage device 103.

In cases where a predetermined time A has not elapsed after access is last made to the LU for which the instruction is issued, that is, in cases where the elapsed time 307 of the LU for which the instruction is issued does not exceed a predetermined time A, the processing is advanced with the state information remaining as 'power conservation instruction'.

In cases where the state information 306 of the LU for which the instruction is issued remains as 'power conservation instruction', the disk control program 201 then confirms the state information 306 of the other LU belonging to the same RAID group as the LU for which the instruction is issued (510). Thereafter, in cases where there is an LU for which the state information 306 is 'normal' in the same RAID group, the disk control program 201 keeps the magnetic disk devices which correspond with the RAID group in normal mode and repeatedly confirms, at fixed intervals, the state information 306 of the LU which belong to the same RAID group as the LU for which the instruction is issued. In cases where the state information 306 of the LU which belong to the same RAID group as the LU for which the instruction is issued is all either 'power conservation instruction' or 'power OFF instruction', the disk control program 201 issues an instruction to the magnetic disk devices 104 via the control command transfer line 111 so that all of the magnetic disk devices which correspond with the RAID group are placed in power conservation mode (511).

Thereafter, the disk control program 201 references the elapsed time 308 of the LU which belongs to the same RAID group as the LU for which the instruction is issued and confirms whether access by the host computer 101 has not occurred for predetermined time A with respect to all of the LU which belong to the RAID group (512). In cases where access by the host computer 101 has not occurred for the predetermined time for all of the LU, that is, in cases where the elapsed time 307 of all the LU which belong to the RAID group exceeds predetermined time A, the disk control program 201 changes the state information 306 of all the LU which belong to the RAID group from 'power conservation instruction' to 'power OFF instruction' (513).

When the rotational state of the motors of the magnetic disk devices 104 are shifted, all of the storage areas of the magnetic disk devices 104 are affected. Hence, not only the access states with respect to the LU for which the instruction is issued but also the access states with respect to the other LU in the magnetic disk devices 104 which correspond with the LU for which the instruction is issued must be considered in the shifting of the rotational state of the magnetic disk devices 104. That is, in cases where the LU is a storage area that extends across a plurality of magnetic disk devices 104 in the RAID group, in order to shift the rotational state of the magnetic disk devices, the disk control program 201 must confirm that not only the state information 306 of the LU for which the instruction is issued but also the state information 306 of the other LU which belong to the same RAID group as the LU for which the instruction is issued is either 'power conservation instruction' or 'power OFF instruction'.

In cases where the state information 306 is changed to 'power OFF instruction' as a result of the processing of the disk control program 201 (514, 509, and 513), the disk control program 201 references the LU management information 202 and confirms that the state information 306 of the other LU in the same RAID group as the LU whose state information 306 has been changed to 'power OFF instruction' are all 'power OFF instruction' (515). In cases where there is an LU whose state information 306 is either 'normal' or 'power conservation instruction', the disk control program 201 repeatedly performs the aforementioned confirmation at fixed intervals.

In cases where the state information 306 of the other LU in the same RAID group as the LU whose state information 306 is changed to 'power OFF instruction' are all 'power OFF instruction', the disk control program 201 issues an instruction to a disk judgment program 603 which is stored in the system area of the magnetic disk devices to judge whether the motors of the magnetic disk devices 104 which correspond with the RAID group may be stopped (516). The processing of the disk judgment program 603 will be described subsequently. The disk control program 201 then receives the judgment result from the disk judgment program 603 (517). In cases where the judgment result is that the motors of the magnetic disk devices 104 which correspond with the RAID group can be stopped (518), the disk control program 201 stops the motors of the magnetic disk devices which correspond with the RAID group (521).

In addition, in cases where the judgment result of the disk judgment program 603 is the judgment that the motors of the magnetic disk devices cannot be stopped owing to the hardware of the magnetic disk devices or the like (519), (518, 519), the disk control program 201 issues an error report to the management device 102 (520). The disk control program 201 also changes the disk state 305 of the LU management information 202 to 'anomalous'.

As is described hereinabove, the LU sometimes extends across the storage area of a plurality of magnetic disk devices which belong to the RAID group and, therefore, stoppage of the rotation of the magnetic disk devices must be performed in RAID group units.

The processing in which the disk judgment program 603 judges whether the motor of the respective magnetic disk devices may be stopped will be illustrated hereinbelow by using FIGS. 6, 7, and 8.

Figures 6, 7:
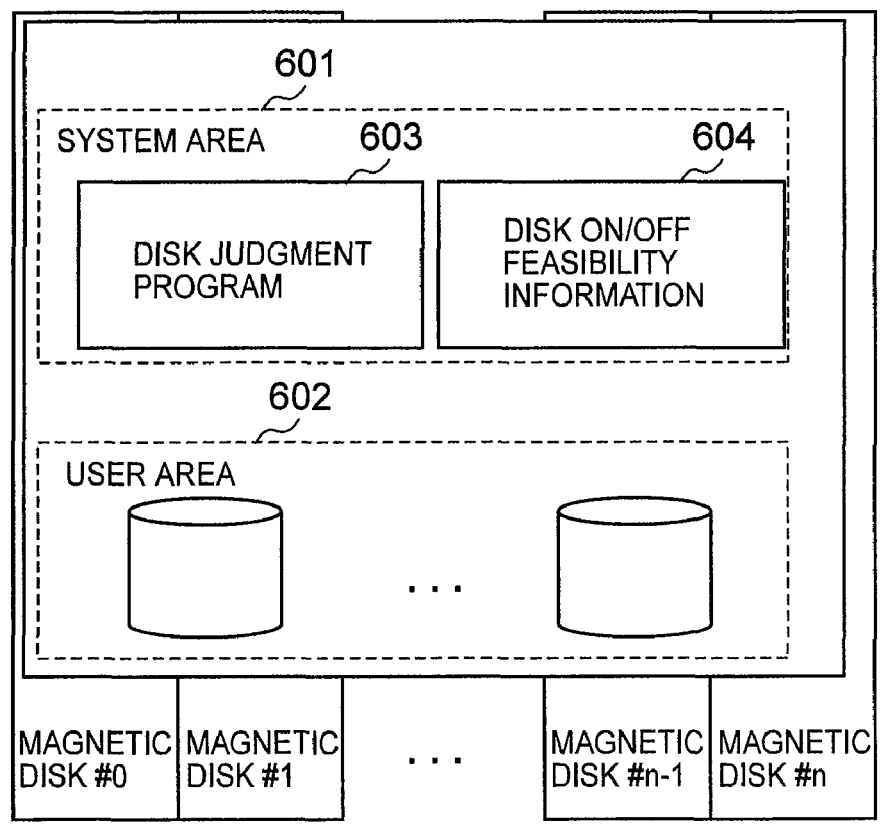
FIG. 6 is a conceptual view of the storage area of a magnetic disk.
FIG. 7 shows information on whether disks can be turned OFF.

FIG. 6 shows a conceptual view of the storage area of the magnetic disk devices 104. The magnetic disk devices 104 are each assigned a number. The storage area of the magnetic disk devices 104 includes a system area 601 in which configuration information and control information of the storage device 103 as well as information that is managed by the system administrator are stored and a user area 602 for storing data transferred from the host computer. The system area 601 stores disk judgment program 603 and a disk ON/OFF feasibility information 604. The disk judgment program 603 is executed by a processor which the magnetic disk devices 104 comprise.

FIG. 7 shows the disk ON/OFF feasibility information 604. The disk ON/OFF feasibility information 604 associates and represents information identifying the magnetic disk devices 104 and information on whether the motors of the magnetic disk devices 104 may be stopped. Disk number 701 shows the identification numbers of the magnetic disk devices 104 and RAID group number 702 shows the identification number of the RAID group to which the magnetic disk devices 104 belong. Motor stoppage feasibility 703 shows whether the rotation of the motors of the magnetic disk devices may be in a stopped state as a result of the judgment by the disk judgment program 603 and 'unfeasible' is shown until an instruction is received from the disk control program 201.

Figure 8:
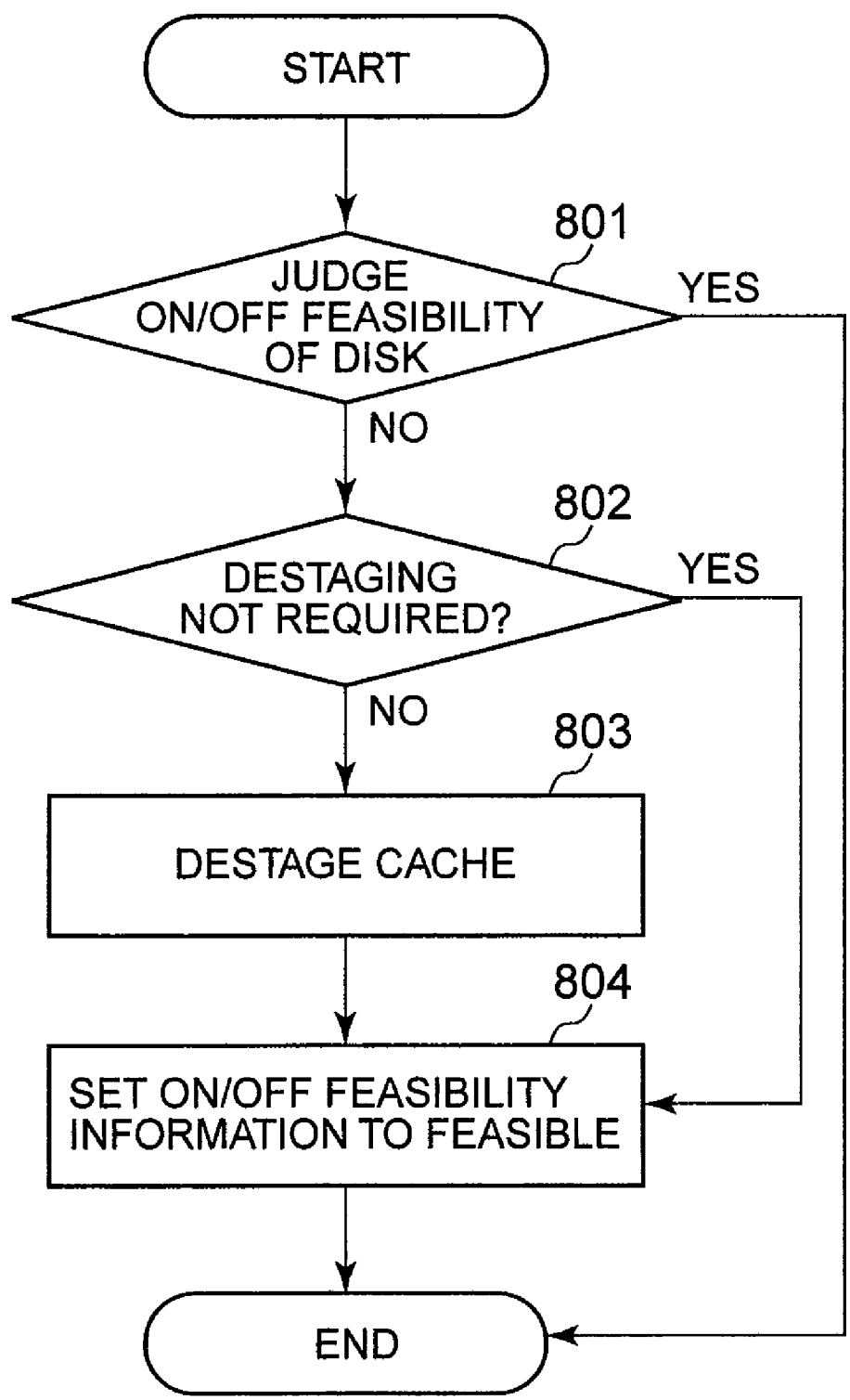
FIG. 8 shows the process flow of a judgment program.

FIG. 8 shows the process flow of the disk judgment program 603. The processing of the disk judgment program 603 starts in the event that the disk judgment program 603 senses an instruction to start the judgment processing from the disk control program 201 (514). At the moment when the processing of the disk judgment program 603 starts, the motor stoppage feasibility 703 of the disk ON/OFF feasibility information 604 of the magnetic disk devices for which a judgment instruction is issued is set to unfeasible. The disk judgment program 603 judges whether the motor stoppage feasibility 703 which corresponds with the magnetic disk devices for which the judgment instruction is issued by the disk control program 201 is feasible or not (801). The processing is terminated and a report to that effect is sent to the disk control program 201 in cases where motor stoppage feasibility 703 is possible. However, in cases where the motor stoppage feasibility 703 is unfeasible, the disk judgment program 603 judges that, in cases where data which have not been written to the magnetic disk devices for which the judgment instruction is issued by the disk control program 201 are not present in the cache memory, de-staging is unnecessary and that, in cases where there are unwritten data in the cache memory, de-staging is required (802). Further, in cases where data which have not been written to the magnetic disk devices are not stored in the cache memory units 1074A and 1074B, the disk judgment program 603 sets the motor stoppage feasibility 703 of the disk ON/OFF feasibility information 604 to feasible (804) and reports the judgment result to the disk control program 201. In cases where data which have not been written to the magnetic disk devices have been stored in the cache memory units 1074A and 1074B, these data are written (de-staged) to the storage area of the magnetic disk devices (803). Thereafter, the motor stoppage feasibility 703 of the disk ON/OFF feasibility information 604 is set to feasible (804) and the judgment result is reported to the disk control program 201.

The other embodiments will be described hereinbelow.

This embodiment illustrates a technology that is related to power supply control for a storage device having two types of enclosure, namely a base enclosure and an additional enclosure. The base enclosure comprises a control unit for controlling the whole storage device, magnetic disk devices, a power supply, upper and lower I/O interfaces and the additional enclosure which is intended as expansion, comprises magnetic disk devices, a power supply, and an I/O interface. The base enclosure, which possesses a control function, is able to provide a storage capacity which meets the desires of the user by connecting a plurality of additional enclosures which provide a storage area.

In the above embodiment, a technology that reduces power consumption by shifting magnetic disk devices that have not been accessed for a fixed period to a power saving mode. However, the above embodiment is limited to curtailing the amount of power consumption of the magnetic disk devices. There is room for further improvement in the case of a storage device that comprises a plurality of enclosures as per this embodiment. That is, there is scope for reducing the amount of power consumption not only of the magnetic disk devices but also that of the cooling device and control unit with in an enclosure. This embodiment describes a technology relating to control of the supply of power to the storage device which makes it possible to reduce the power consumption still further by performing power conservation control not only in magnetic disk device units but also in enclosure units while maintaining the function for transmitting signals between the enclosures of the storage device and judging the state of access to the storage areas of the storage system.

Figure 9:
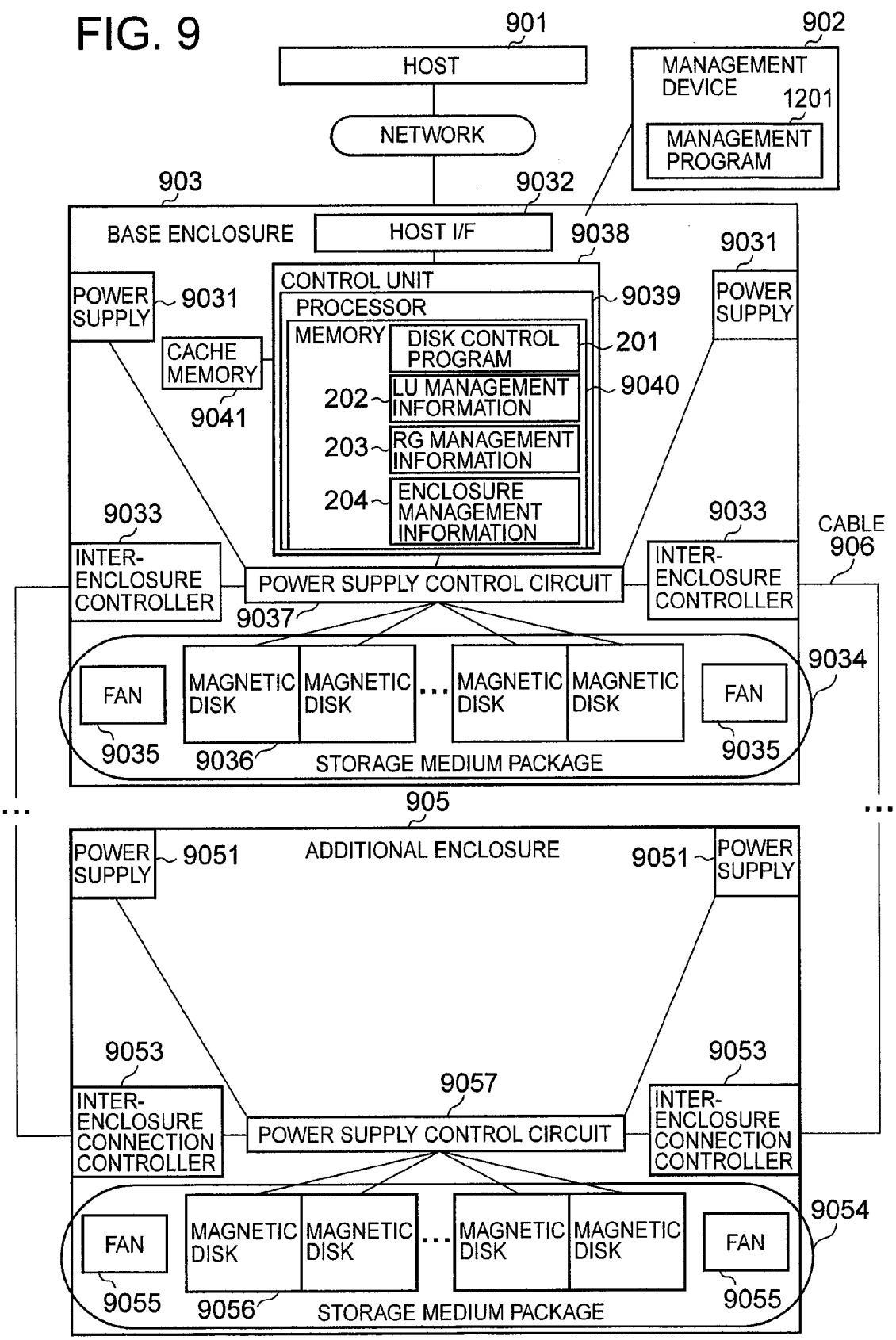
FIG. 9 shows a second configuration view of the storage system.

FIG. 9 shows a configuration view of a second storage system of the present invention.

The storage device comprises a base enclosure 903 and an additional enclosure 905 and comprises one base enclosure and one or more additional enclosures, for example.

The base enclosure 903 is connected via a network to a host computer 901 and a management device 902, and is connected via a cable 906 to additional enclosures 905 and performs control of the whole storage device also including the additional enclosures. Hence, the base enclosure 903 holds system configuration information for the purpose of managing the configuration of the whole storage device and the power supply state.

The data which are stored in the storage areas of the magnetic disk devices which the base enclosure 903 and additional enclosures 905 comprise are afforded RAID-based redundancy. The storage device supplies an upper device such as the host computer 901 with the storage area of the magnetic disk devices as a logical storage area (LU). The storage areas of the base enclosure 903 and additional enclosures 905 comprise one or more RAID groups. Further, a plurality of LU are included in a RAID group.

The management device 902 is used by the system administrator, for example, and makes changes to the settings of the configuration information of the storage device such as changes to the RAID group settings or changes to the settings of the LU management information which is stored in a memory 9040 of the base enclosure 903. The host computer 901 issues commands to read and write data with respect to the storage areas of the magnetic disk devices of the storage device via a network. The base enclosure 903 accesses magnetic disk devices 9056 and 9036 of the base enclosure 903 or additional enclosures 905 in accordance with a command that is issued by the host computer 901 and reads and writes data with respect to the storage areas of the magnetic disk devices 9056 and 9036.

The base enclosure 903 comprises a power supply unit 9031, a host I/F 9032, an inter-enclosure connection controller 9033, a storage medium package 9034, a power supply control circuit 9037, a control unit 9038, and a cache memory 9041. The control unit 9038 comprises a processor 9039 and a memory 9040 and the memory 9040 stores the disk control program 201 mentioned in the previous embodiment, the LU management information 202 shown in FIG. 3, the RAID group management information (RG management information) 203 shown in FIG. 4, and the enclosure management information 204 which will be described subsequently.

The storage medium package 9034 contains involatile storage media such as a plurality of magnetic disk devices 9036, for example, and a FAN 9035 or the like for cooling the involatile storage media. As per the previous embodiment, the magnetic disk devices are able to assume three rotational states, namely, a normal mode, a power conservation mode, and a motor stoppage mode in response to an instruction from a higher level device.

Power is supplied to the base enclosure 903 via the power supply unit 9031. In this embodiment, a redundant configuration in which two of each of the power supply unit 9031 are provided in each enclosure is shown but there may also be any number of power supply units 9031. The power supply control circuit 9037 receives an instruction from the control unit 9038 and performs ON/OFF switching of the power supply to the storage medium package 9034. The base enclosure 903 is connected to a host computer 901 via a host I/F 9032 and a SAN network or other network and the additional enclosures 905 are connected to the host computer 901 via the base enclosure 903. The additional enclosures 905 comprise a power supply unit 9051, a power supply control circuit 9057, a storage medium package 9054, and an inter-enclosure connection controller 9053. The additional enclosures 905 is connected to the base enclosure 903 via the inter-enclosure connection controller 9053. The base enclosure 903 and additional enclosures 905 are cascade-connected to one another. That is, the transmission of signals and data between the base enclosure 903 and the additional enclosures 905 and between the additional enclosures 905 is performed via a cable 906 in the order of the adjacent enclosures.

The storage area of the storage device comprises a plurality of RAID groups. Further, the reading and writing of data from the host computer 901 to the storage device are carried out with the LU, which constitutes a portion of the storage area in the RAID group, as the target. The storage device comprises a plurality of RAID groups and a RAID group comprises a plurality of LU. In cases where read and write commands from the host computer to the storage device are issued, the commands are first received by the base enclosure 903.

The disk control program 201 of the base enclosure 903 judges, based on the LU management information 202 and enclosure management information 204, which storage area in the base enclosure 903 or the additional enclosure 905 among the additional enclosures 905 the magnetic disk device comprising the storage area constituting the access target is located in and, if the case of a storage area which is contained in a magnetic disk device of an additional enclosure, the disk control program 201 transmits a command to the additional enclosure 905 via the inter-enclosure controllers 9033 and 9053.

The system area of the magnetic disk device which each enclosure comprises stores disk judgment program 603 for judging whether the motors of the magnetic disk devices of the respective enclosures may be stopped and ON/OFF feasibility information 604 which holds the judgment result of the disk judgment program 603.

The disk control program 201 and disk judgment program 603 reference the LU management information 202 and RAID group management information 203 in the event of an instruction from the management device 902 as per the above embodiment and performs control to shift the rotational state of the magnetic disk device corresponding with the state of access with respect to the storage device by the host computer 901 in accordance with the flow in FIG. 5.

Figures 10, 11:
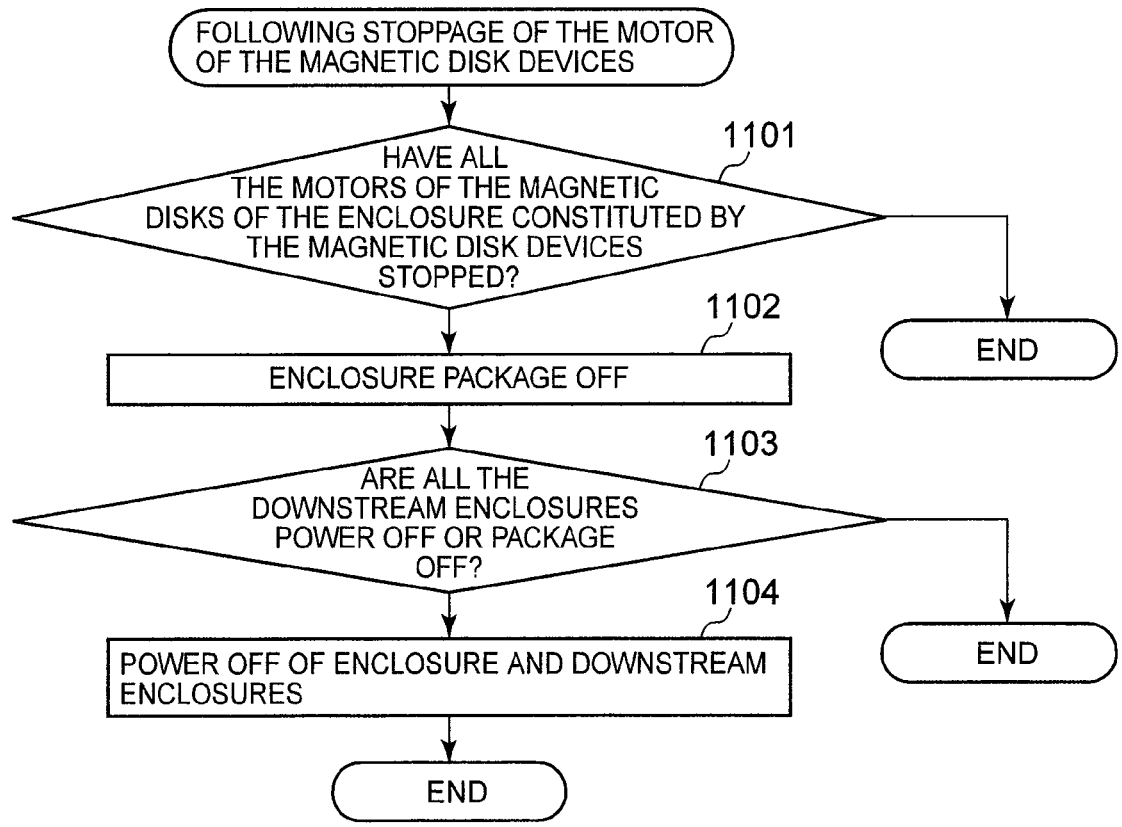
FIG. 10 shows enclosure management information.
FIG. 11 shows the process flow for power OFF in enclosure units by the control program.

FIG. 10 shows enclosure management information 204 of the memory 9040 of the base enclosure and shows the power supply state for each enclosure. The enclosure number 1001 is the identification number of each enclosure and the enclosure state 1002 indicates the power supply state of each enclosure. For example, in cases where the enclosure state 1002 is 'package ON', this indicates that power is being supplied to the whole enclosure including the storage medium package in the enclosure. In cases where the enclosure state 1002 is 'package OFF', this indicates that power is being supplied to the enclosure except for the package part. In cases where the enclosure state 1002 is 'enclosure power OFF', this indicates that power is not being supplied to the enclosure. The disk number 1003 indicates identification information on the magnetic disk devices of each enclosure. The enclosure management information 204 is updated by the disk control program whenever the power supply state is actually switched.

The disk control program advances the processing in accordance with the flow shown in FIG. 5 and the processing which is then carried out by the disk control program 201 in cases where the rotation of the motors of the magnetic disk devices is stopped will be described hereinbelow by using FIG. 11.

FIG. 11 shows the flow of power OFF processing in enclosure units by the disk control program 201.

The processing shown in FIG. 11 is started given that the motors of the magnetic disk devices are stopped in RAID group units (521) as a result of the processing of the disk control program 201 shown in FIG. 5. First, the disk control program 201 references the enclosure management information 204 and specifies an enclosure in which magnetic disk devices whose motors have stopped are contained. The disk control program 201 then judges whether all of the motors of the magnetic disk devices in the enclosure have entered the motor stoppage mode (1101). In cases where there is a magnetic disk device whose motor has not been stopped in the enclosure, the processing of the disk control program 201 is terminated. In cases where all of the motors of the magnetic disk devices in the enclosure have stopped, the disk control program 201 issues an instruction to the power supply control circuit to stop the supply of power to the storage medium package 9034 of the enclosure (1102). The disk control program 201 also references the enclosure management information 204 and judges whether the enclosure states 1002 corresponding with the enclosures downstream of the enclosure for which the supply of power to the storage medium package 9034 has been stopped are all 'package OFF' or 'enclosure power OFF' (1103). Further, in cases where the enclosure states of the enclosure management information corresponding with the enclosures downstream of the former enclosure are all 'package OFF' or 'enclosure power OFF', the supply of power to these enclosures is stopped (1104). In other cases, the processing is terminated. An enclosure which is downstream of the enclosure for which the supply of power to the storage medium package has been stopped is an enclosure which transmits signals to the base enclosure via the inter-enclosure controller 9033 of the enclosure for which the supply of power to the storage medium package 9034 has been stopped.

The storage device of this embodiment has a configuration in which a plurality of enclosures are cascade-connected. Access to the storage areas of the respective enclosures by the host computer 901 is made via the inter-enclosure controller 9033 of the enclosure upstream of all the base enclosures 903 and the enclosure being accessed. Hence, power must be supplied to the enclosure upstream of the enclosure being accessed. However, it is not necessary to supply power to the storage medium package 9034 unless all of the magnetic disk devices in the enclosure are accessed. Very precise power supply control which considers power conservation effects is possible by stopping the supply of power to the storage medium package 9034 while supplying power to parts other than the storage medium package 9034 of the enclosure by switching the power supply control circuit 9037 of each enclosure.

Figure 12:
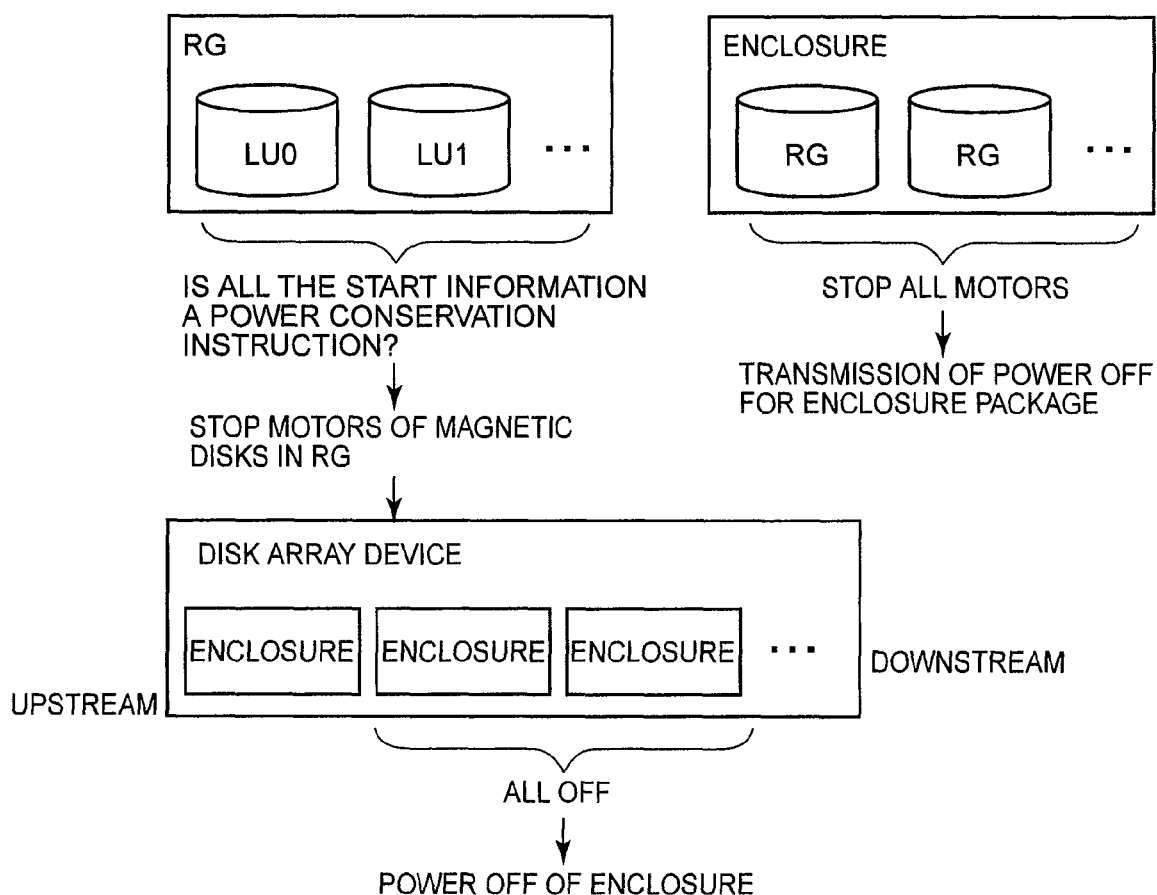
FIG. 12 is a conceptual view of the processing of the whole system.

FIG. 12 shows, by way of a conceptual view, the flow of all the processing of the power supply control of this embodiment.

A disk array device comprises a plurality of enclosures and each enclosure comprises a plurality of RAID groups (RG).

Further, a RAID group (RG) comprises a plurality of LU. First, when the state information for all of the LU in the RG is 'power conservation instruction', the motors of the magnetic disk devices which constitute the RG are stopped. Further, in cases where the motors of all the RG in the enclosure are stopped, the transmission of power to the storage medium package is OFF. In addition, if the power supply is OFF for enclosures which are downstream of an enclosure for which the transmission of power to the storage medium package is OFF, the supply of power to the former enclosure is OFF. Thus, power conservation control which corresponds with the state of access by the host computer is implemented.

FIG. 13 is an example of a screen display for a device such as the management device 902. The system administrator or the like is able to grasp the power supply control state of the whole system at the current time from the screen in FIG. 13. Information relating to the power supply control is transmitted by the disk control program 201 of the base enclosure 903 to the management program 9021 which is executed by the management device 902 and the management program is displayed on the screen of the management device 902. Information may also be displayed on a computer other than the management device 902.

Enclosure 01 is an example of a screen display which schematically shows the LU and the RAID groups of the base enclosure (1301). Enclosure 08 is an example of a screen display which schematically shows the LU and the RAID groups of the additional enclosure (1302). The storage area which is indicated by the oblique lines on the screen display indicates that the motor of the magnetic disk device which corresponds with the storage area has stopped. The power supply control of the storage device is implemented by taking physical structures as units such as the magnetic disk device units and enclosure units or the like. In contrast, access by the host computer is performed by taking the LU, which constitute logical storage areas, as units. Thus, a visual representation in which the states of the power supply control performed in physical units and the logical storage areas are mapped facilitates management by the system administrator. In addition, the RAID groups may be storage areas of magnetic disk devices which are in the same enclosure or may be storage areas which extend across the storage areas of a plurality of enclosures. The RAID configuration and power supply states can also be grasped visually in cases where a RAID group extends across the storage areas of a plurality of enclosures.

Power supply control history information 1303 associates and stores time information for when the disk control program 201 has performed power supply control up to the present, as well as information on enclosures which are to be control targets, RAID groups which are to be control targets, and LU which are to be control targets.

The time 1305 of the power supply control status history information indicates the times when power supply control is performed. The power supply control target 1306 indicates the identification number of the enclosure having the storage area constituting the power supply control target, the RAID group identification number, and the LUN and so forth. The control content 1307 indicates the specific nature of the power supply control that is actually performed. The power supply control history information 1303 may also be automatically updated in the event that the disk control program 201 transmits this information to the management program when the power supply control by the disk control program 201 is performed.

The power supply control information 1304 is an example of a screen display for indicating the current status of the power supply of the storage area units selected by the system administrator or the like. The number of RAID groups and LU of the storage device is huge and it is seemingly difficult to grasp the power supply states of the specified RAID groups and LU only visually. Hence, management by the system administrator is facilitated by showing the power supply states for the magnetic disk devices which correspond with the LUN, enclosure identification number, and the storage area of the RAID group identification number which are selected on the screen by the system administrator. The storage media of the storage device were described as magnetic disk devices in this embodiment. However, it is understood that the storage media may also be involatile storage media such as flash memory or storage media of another type.

What is claimed is:

1. A storage device, comprising:
a plurality of magnetic disk devices;
a rotational state control unit which transmits, to the magnetic disk devices, a signal for controlling a rotational state of motors of the magnetic disk devices; and
a disk control unit which provides a host computer with a logical storage area comprising storage areas of the plurality of magnetic disk devices,
wherein a management device is connected to the storage device, and for each of a plurality of logical storage areas, the management device transmits, to the disk control unit, an instruction to change the rotational state of the magnetic disk devices that correspond to the logical storage area of the plurality of logical storage areas,
wherein the instruction to change the rotational state of the magnetic devices comprises an instruction to change to a power conservation state or an instruction to change to a power OFF state,
wherein the disk control unit comprises a processor and a memory,
wherein the memory comprises:
a disk control program;
access information indicating, for each of the logical storage areas, access by the host computer;
instruction information indicating, for each of the logical storage areas, an instruction which is received from the management device; and
management information indicating the arrangement of the logical storage areas in the magnetic disk devices,
wherein the processor executes and processes the disk control program,
wherein when the disk control unit receives from the management device the instruction to change to a power conservation state or the instruction to change to a power OFF state, and the access information indicates that the host computer is accessing the first logical storage area, the instruction information corresponding to the first logical storage area is not changed to indicate the instruction to change to the power conservation state or the instruction to change to the power OFF state,
wherein when the disk control unit receives from the management device the instruction to change to a power conservation state or the instruction to change to a power OFF state, and the access information indicates that the host computer is not accessing the first logical storage area, the instruction information corresponding to the first logical storage area is changed to indicate the instruction to change to the power conservation state or the instruction to change to the power OFF state, respectively,
wherein when the instruction information is changed to indicate the instruction to change to the power conservation state, and the host computer has not accessed the first logical storage area for a predetermined amount of time, the disk control unit changes the instruction information from indicating the instruction to change to the power conservation state to indicating the instruction to change to a power OFF state, wherein the disk control program reads, from the instruction information, the instruction to change to the power conservation state or the instruction to change to the power OFF state, wherein the disk control program reads, from the management information, the correspondence between the first logical storage area and a first magnetic disk device of the plurality of magnetic disk devices, wherein the disk control program references the management information and performs a first determination as to whether the logical storage areas other than the first logical storage area correspond to the first magnetic disk device, and wherein the disk control program performs a second determination as to whether to change the rotational state of the first magnetic disk device in accordance with the instruction information which corresponds to the logical storage areas other than the first logical storage area contained in the first magnetic disk device.

2. The storage device according to claim 1, wherein when a result of the first determination is that the logical storage areas other than the first logical storage area do not correspond to the first magnetic disk device, an instruction to change the first magnetic disk device to the power conservation state or an instruction to change the first magnetic disk device to the power OFF state is transmitted to the rotational state control unit.

3. The storage device according to claim 1, wherein when a result of the first determination is that a second logical storage area of the plurality of logical storage areas corresponds to the first magnetic disk device, the instruction information corresponding to the second logical storage area is referenced, and only when the instruction information of the second logical storage area is an instruction to change the magnetic disk devices corresponding to the second logical storage area to the power conservation state, or an instruction to change the magnetic disk devices corresponding to the second logical storage area to the power OFF state, an instruction to change the rotational state of the first magnetic disk device is transmitted to the rotational state control unit.

4. The storage device according to claim 1, wherein the disk control program changes the instruction information which corresponds to the first logical storage area in accordance with the access information.

\* \* \* \* \*